US010656784B2

(12) United States Patent
Jin

(10) Patent No.: US 10,656,784 B2
(45) Date of Patent: May 19, 2020

(54) METHOD OF ARRANGING ICON AND ELECTRONIC DEVICE SUPPORTING THE SAME

(71) Applicant: SAMSUNG ELECTRONICS CO., LTD., Suwon-si (KR)

(72) Inventor: Yujie Jin, Tianjin (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 389 days.

(21) Appl. No.: 14/739,193

(22) Filed: Jun. 15, 2015

(65) Prior Publication Data

US 2015/0363095 A1   Dec. 17, 2015

(30) Foreign Application Priority Data

Jun. 16, 2014  (CN) .......................... 2014 1 0264370
Apr. 20, 2015  (KR) ........................ 10-2015-0055350

(51) Int. Cl.
*G06F 3/048*       (2013.01)
*G06F 3/0481*      (2013.01)
*G06F 3/0482*      (2013.01)
*G06F 3/0488*      (2013.01)

(52) U.S. Cl.
CPC ........ *G06F 3/04817* (2013.01); *G06F 3/0482* (2013.01); *G06F 3/04883* (2013.01)

(58) Field of Classification Search
CPC .......................................... G06F 3/0481–0489
See application file for complete search history.

(56) References Cited

U.S. PATENT DOCUMENTS

| | | | | |
|---|---|---|---|---|
| 5,592,605 A * | 1/1997 | Asuma | ................. | G06F 3/0483 715/775 |
| 5,638,504 A * | 6/1997 | Scott | ..................... | G06F 9/451 715/202 |
| 5,684,970 A * | 11/1997 | Asuma | ................. | G06F 3/0483 715/775 |
| 5,742,286 A * | 4/1998 | Kung | ................... | G06F 3/0486 715/733 |
| 5,745,112 A * | 4/1998 | Hirose | .................. | G06F 9/451 715/769 |
| 5,754,179 A * | 5/1998 | Hocker | ................ | G06F 3/0481 715/835 |
| 6,262,724 B1 * | 7/2001 | Crow | ..................... | G06F 3/048 715/723 |
| 6,476,834 B1 * | 11/2002 | Doval | ................... | G06F 9/4443 715/826 |
| 6,781,575 B1 * | 8/2004 | Hawkins | ........... | H04M 1/27455 345/169 |
| 7,954,060 B2 * | 5/2011 | Sharma | ................. | G06F 3/0481 709/224 |

(Continued)

FOREIGN PATENT DOCUMENTS

CN          103076947 A          5/2013
CN          103092469 A          5/2013

*Primary Examiner* — Steven B Theriault
(74) *Attorney, Agent, or Firm* — Sughrue Mion, PLLC

(57) ABSTRACT

A method of arranging an icon on an electronic device includes displaying a plurality of icons in a plurality of regions of a user interface (UI), receiving a user input for each of at least one region displaying an icon among the plurality of regions, and arranging an icon selected based on the received user input in a region corresponding to a number indicated by the received user input.

17 Claims, 14 Drawing Sheets

(56) References Cited

U.S. PATENT DOCUMENTS

| | | | | |
|---|---|---|---|---|
| 8,386,950 B2* | 2/2013 | Henderson | G06F 3/04817 | 715/748 |
| 8,407,613 B2* | 3/2013 | Hope | G06F 3/04817 | 715/764 |
| 8,423,916 B2* | 4/2013 | Chihara | G06F 3/04883 | 345/156 |
| 8,458,615 B2* | 6/2013 | Chaudhri | G06F 3/04817 | 715/784 |
| 8,687,023 B2* | 4/2014 | Markiewicz | G06F 3/0485 | 345/173 |
| 8,739,056 B2* | 5/2014 | Palmer | G06F 3/0486 | 715/736 |
| 8,799,798 B2* | 8/2014 | Ito | G06F 3/04883 | 715/764 |
| 9,146,634 B2* | 9/2015 | Yang | G06F 3/0486 | |
| 9,268,481 B2* | 2/2016 | Nemoto | G06F 3/0488 | |
| 9,372,594 B2* | 6/2016 | Wang | G06F 3/04817 | |
| 9,395,899 B2* | 7/2016 | Kim | G06F 3/0486 | |
| 9,395,900 B2* | 7/2016 | Bae | G06F 3/04817 | |
| 9,459,794 B1* | 10/2016 | Soegiono | G06F 3/04883 | |
| 9,535,600 B2* | 1/2017 | Lee | G06F 3/0486 | |
| 9,569,100 B2* | 2/2017 | Rav-Acha | G06F 3/04883 | |
| 9,621,710 B2* | 4/2017 | Park | G06F 3/0482 | |
| 9,710,149 B2* | 7/2017 | Shim | G06F 3/0488 | |
| 2002/0057292 A1* | 5/2002 | Holtz | G06F 3/0486 | 715/769 |
| 2002/0196271 A1* | 12/2002 | Windl | G06F 3/0486 | 715/734 |
| 2003/0184587 A1* | 10/2003 | Ording | G06F 3/0486 | 715/769 |
| 2003/0222915 A1* | 12/2003 | Marion | G06F 3/0486 | 715/769 |
| 2004/0004638 A1* | 1/2004 | Babaria | G06F 3/0481 | 715/805 |
| 2004/0119763 A1* | 6/2004 | Mizobuchi | G06F 3/04883 | 715/863 |
| 2004/0240739 A1* | 12/2004 | Chang | G06F 3/04883 | 382/186 |
| 2005/0060653 A1* | 3/2005 | Fukase | G06F 3/0486 | 715/724 |
| 2005/0275636 A1* | 12/2005 | Dehlin | G06F 3/011 | 345/173 |
| 2006/0001656 A1* | 1/2006 | LaViola, Jr. | G06F 3/04883 | 345/179 |
| 2007/0150834 A1* | 6/2007 | Muller | G06F 3/04817 | 715/810 |
| 2007/0177801 A1* | 8/2007 | Kawamoto | A63F 13/10 | 382/187 |
| 2007/0234226 A1* | 10/2007 | Szeto | G06F 3/0486 | 715/769 |
| 2008/0313568 A1* | 12/2008 | Park | G06F 3/04817 | 715/835 |
| 2009/0058821 A1* | 3/2009 | Chaudhri | G06F 3/04817 | 345/173 |
| 2009/0064055 A1* | 3/2009 | Chaudhri | G06F 3/04817 | 715/863 |
| 2009/0178008 A1* | 7/2009 | Herz | G06F 3/04817 | 715/840 |
| 2010/0070931 A1* | 3/2010 | Nichols | G06F 3/0488 | 715/863 |
| 2010/0088597 A1* | 4/2010 | Shin | G06F 8/38 | 715/704 |
| 2010/0125806 A1* | 5/2010 | Igeta | G06F 3/0481 | 715/770 |
| 2010/0185949 A1* | 7/2010 | Jaeger | G06F 3/0481 | 715/730 |
| 2010/0262591 A1* | 10/2010 | Lee | G06F 3/04883 | 707/706 |
| 2010/0295789 A1* | 11/2010 | Shin | G06F 1/1626 | 345/168 |
| 2011/0252350 A1* | 10/2011 | Chaudhri | G06F 3/04817 | 715/769 |
| 2011/0271182 A1* | 11/2011 | Tsai | G06F 3/0483 | 715/702 |
| 2012/0084692 A1* | 4/2012 | Bae | G06F 3/04817 | 715/769 |
| 2012/0088548 A1* | 4/2012 | Yun | G08C 17/02 | 455/557 |
| 2012/0096396 A1* | 4/2012 | Ording | G06F 9/4443 | 715/799 |
| 2012/0110496 A1* | 5/2012 | Lee | G06F 3/0488 | 715/778 |
| 2012/0165076 A1* | 6/2012 | Yu | G06F 3/0481 | 455/566 |
| 2012/0309463 A1* | 12/2012 | Lee | G06F 3/0482 | 455/566 |
| 2012/0311466 A1* | 12/2012 | Kluttz | G06F 3/0488 | 715/760 |
| 2012/0311485 A1* | 12/2012 | Caliendo, Jr. | G09G 5/14 | 715/784 |
| 2013/0050119 A1* | 2/2013 | Nemoto | G06F 3/0488 | 345/173 |
| 2013/0151981 A1* | 6/2013 | Green | G06F 3/0481 | 715/744 |
| 2014/0068477 A1* | 3/2014 | Roh | G06F 3/0486 | 715/765 |
| 2014/0082563 A1* | 3/2014 | Kim | G06F 3/0482 | 715/835 |

* cited by examiner

METHOD OF ARRANGING ICON AND ELECTRONIC DEVICE SUPPORTING THE SAME

CROSS-REFERENCE TO RELATED APPLICATIONS

This application claims the benefit of State Intellectual Property Office (SIPO) of the People's Republic of China No. 201410264370.6, filed on Jun. 16, 2014, in State Intellectual Property Office (SIPO) of the People's Republic of China, and Korean Patent Application No. 10-2015-0055350, filed on Apr. 20, 2015, in the Korean Intellectual Property Office, the disclosures of which are incorporated herein in their entirety by reference.

BACKGROUND

1. Field

One or more exemplary embodiments relate to a method of arranging an icon and an electronic device supporting the same.

2. Description of the Related Art

With advancements in electronic technology, various electronic device products, e.g., mobile terminals, tablet personal computers (PCs), PCs, game consoles, multimedia players, etc., have become indispensable parts to our lives. As a number of functions of terminals or a number of functions supported by applications installed in terminals increases, various icons, e.g., application icons, widget icons, folder icons, file icons, etc., may be displayed in a plurality of screens. Such various icons are arranged in one or more screens in a consecutive order in which they are generated.

In the related art, when icons are rearranged, a user should drag the icons to desired locations by performing a drag-and-drop operation.

However, when a user drags and drops an icon to move the icon according to the related art, a long drag operation may be needed to be performed according to the location of the icon. For example, when a user wants to move an icon from a current screen to another screen, the user would have difficulties in dragging the icon to a corner of the current screen for page slipping. Also, when a user wants to rearrange a large number of icons, it may take a long time and be inefficient to repeatedly perform a drag operation.

SUMMARY

One or more exemplary embodiments include a method of arranging icons by moving icons arranged on a user interface (UI) in a simple and easy manner according to numbers instructed by a user input, and an electronic device supporting the method.

Additional aspects will be set forth in part in the description which follows and, in part, will be apparent from the description, or may be learned by practice of the presented exemplary embodiments.

According to one or more exemplary embodiments, a method of arranging an icon in an electronic device includes displaying a plurality of icons in a plurality of regions of a user interface (UI); receiving a user input for each of at least one region displaying an icon among the plurality of regions; and arranging an icon selected based on the received user input in a region corresponding to a number indicated by the received user input.

In one exemplary embodiment, the receiving of the user input may include receiving a handwriting input performed by drawing a number on each of the at least one region displaying the icon among the plurality of regions, a touchdown input corresponding to a number, or a long-touch input performed for a time period corresponding to the number.

In one exemplary embodiment, the arranging of the selected icons may further include determining the number indicated by the received user input. The determining of the number indicated by the received user input may further include displaying the determined numbers in the at least one region.

In one exemplary embodiment, the arranging of the selected icons may further include displaying a preview of the icon arranged in the region corresponding to the number.

In one exemplary embodiment, the method may further include displaying setting a number for each of the plurality of regions.

In one exemplary embodiment, when the UI includes a plurality of pages, the setting of the number for each of the plurality of regions may include sequentially setting numbers for all of the plurality of regions included in the plurality of pages or setting numbers for a plurality of regions included in each of the plurality of pages.

In one exemplary embodiment, the method may further include receiving a user input for selecting at least one page among the plurality of pages, and the arranging of the selected icon may further include arranging the selected icon in a region corresponding to the selected at least one page and the number.

In one exemplary embodiment, the method may further include determining an arrangement of a related icon arranged in the region corresponding to the number before the selected icon is arranged.

In one exemplary embodiment, the method may further include arranging the related icon in a region in which the selected icon has been arranged.

In one exemplary embodiment, the determining of the arrangement of the related icon may include receiving a user input for selecting a plurality of related icons; and arranging the plurality of related icons in regions corresponding to the indicated numbers, based on an order in which the plurality of related icons are selected or numbers set for respective regions displaying the plurality of related icons.

According to one or more exemplary embodiments, an electronic device includes a display unit configured to display a plurality of icons in a plurality of regions of a user interface (UI); an input unit configured to receive a user input for each of at least one region displaying an icon among the plurality of regions; and a controller configured to control the display unit to arrange an icon selected based on the user input in a region corresponding to a number indicated by the user input.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
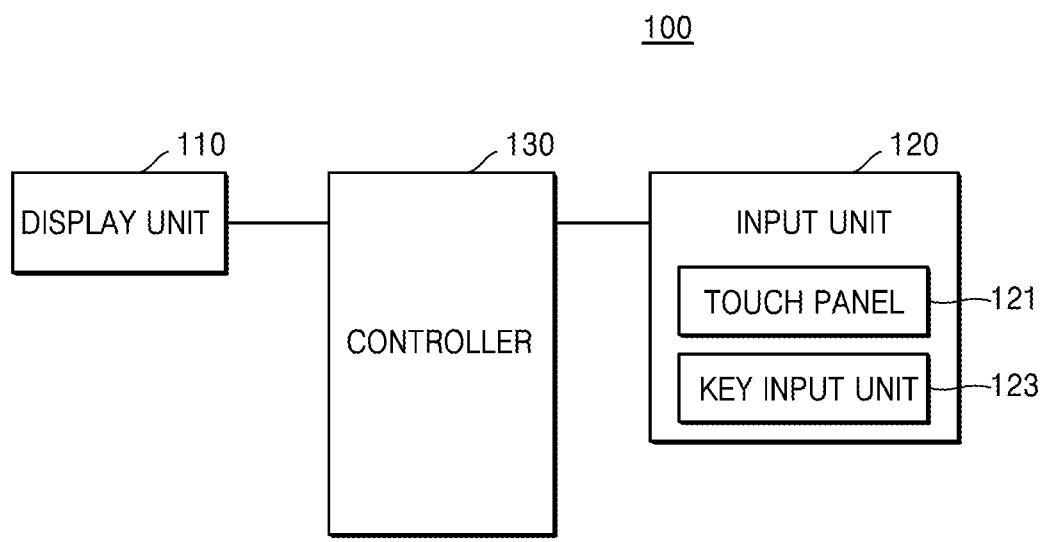
FIG. 1 is a block diagram of an electronic device on which icons are arranged according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, expressions such as "at least one of," when preceding a list of elements, modify the entire list of elements and do not modify the individual elements of the list.

Before various embodiments are described, the term 'electronic device' should be understood as a device capable of displaying various screens thereon, for example, a smart phone, a tablet personal computer (PC), a digital camera, a computer monitor, a personal digital assistant (PDA), an electronic note, a desktop PC, a portable multimedia player (PMP), a media player, e.g., an MP3 player, a wrist watch, a game console, etc.

Hereinafter, exemplary embodiments will be described in detail with reference to the accompanying drawings. However, the inventive concept is not limited thereto and the exemplary embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

FIG. 1 is a block diagram of an electronic device 100 on which icons are arranged according to an exemplary embodiment.

Referring to FIG. 1, the electronic device 100 according to an exemplary embodiment may include a display unit 110, an input unit 120, and a controller 130.

In one exemplary embodiment, the display unit 110 may display data on a screen thereof under control of the controller 130. For example, when the controller 130 processes (e.g., decodes) data, and stores the processed (decoded) data in a buffer (not shown), the display unit 110 may display the stored data on the screen by converting the data into an analog signal. The display unit 110 may display various screens related to use of the electronic device 100 (e.g., a locking screen, a home screen, an application execution screen, a menu screen, a keypad screen, a message creating screen, an Internet screen, etc.), under control of the controller 130.

In one exemplary embodiment, the display unit 110 may be a liquid crystal display (LCD), an active matrix organic light emitted diode (AMOLED), a passive matrix organic light emitted diode (PMOLED), a flexible display, or a transparent display.

In one exemplary embodiment, the display unit 110 may display an icon or the like on the screen under control of the controller 130. In one exemplary embodiment, the icon may be, for example, an application icon, a widget icon, a folder icon, a file icon, etc. When a user input on the icon is received (e.g., when a user clicks the icon) a function corresponding to the icon may be performed or a folder or file corresponding to the icon may be opened.

In one exemplary embodiment, the display unit 110 may display a user interface (UI) under control of the controller 130. In one exemplary embodiment, the display unit 110 may display a plurality of icons in a plurality of regions of a UI under control of the controller 130. In one exemplary embodiment, the display unit 110 may display a UI including a plurality of pages under control of the controller 130. In one exemplary embodiment, the display unit 110 may display an icon arranged (or rearranged), based on a user input on at least one region displaying an icon among a plurality of regions of a UI, under control of the controller 130. In one exemplary embodiment, when a number set for at least one region displaying an icon among a plurality of regions of a UI is determined as indicated by a user input, the display unit 110 may display the determined number in the at least one region displaying an icon, under control of the controller 130.

In one exemplary embodiment, the input unit 120 may include a touch panel 121, a key input unit 123, etc. In one exemplary embodiment, when a certain location on the touch panel 121 is touched by a user's finger or the like, the touch panel 121 may generates a touch event and transmit the generated touch event to the controller 130. The coordinates included in the touched location, i.e., the location touched by the user's finger, a pen, or the like, may be transmitted to the controller 130, and the controller 130 may determine, as a touched coordinate, at least one among coordinates included in the touched location.

In one exemplary embodiment, the touch panel 121 may receive at least one among a handwriting input performed by drawing a number by a user, a touch-down input performed a specific number of times, and a long-touch (or holding) input performed for a predetermined time.

In one exemplary embodiment, the key input unit 120 may include a plurality of keys for receiving number or character information and setting various functions. The plurality of keys may include a menu calling key, a screen on/off key, a power on/off key, a volume control key, etc. The key input unit 123 generates a key event related to user setting or controlling a function of the electronic device 100, and transmits the key event to the controller 130. The plurality of keys of the key input unit 123 may be referred to as hard keys, and virtual keys displayed on the display unit 110 may be referred to as soft keys.

In one exemplary embodiment, the key input unit 123 may include an image for displaying a preview under control of the controller 130. In another exemplary embodiment, the key input unit 123 may include an image for arranging (or rearranging) icons under control of the controller 130.

In one exemplary embodiment, the controller 130 may control overall operations of the electronic device 100 and the flow of signals between components included in the electronic device 100, and perform a data processing function. For example, the controller 130 may include a central processing unit (CPU), an application processor (AP), etc. Also, the controller 130 may include a single core processor or a multi-core processor.

The functions of the controller 130 will be described in detail with reference to FIGS. 2 to 12 below.

Figure 2:
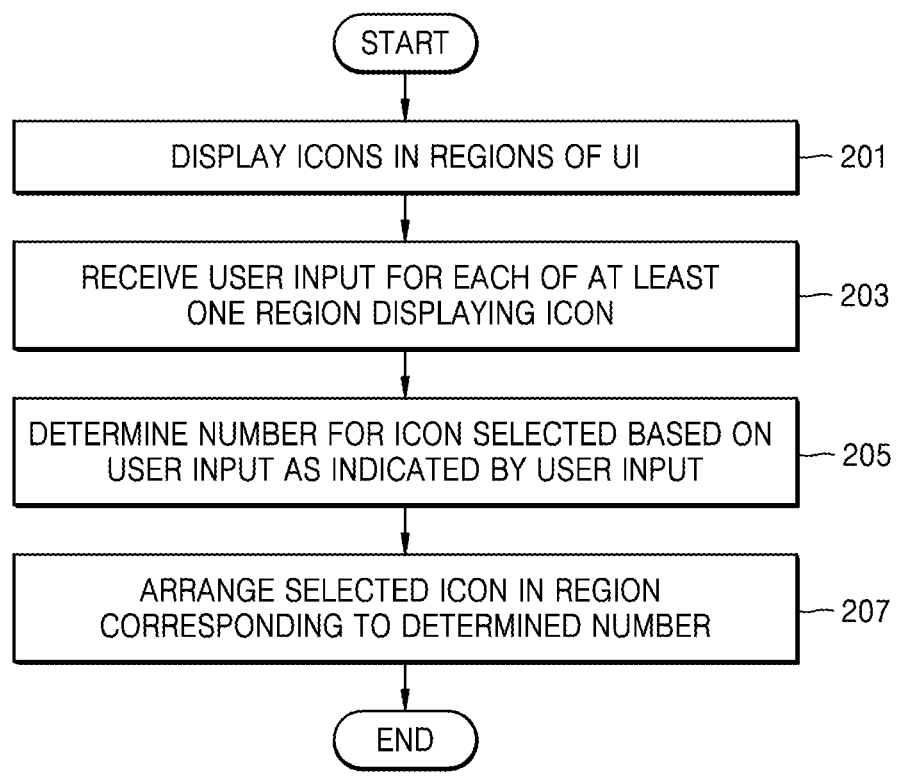
FIG. 2 is a flowchart of a method of arranging icons according to an exemplary embodiment.

FIG. 2 is a flowchart of a method of arranging icons according to an exemplary embodiment.

Referring to FIG. 2, in operation S201, the controller 130 may control the display unit 110 to display a plurality of icons in a plurality of regions of a UI.

In one exemplary embodiment, the UI may be a home screen including a plurality of icons, a menu screen, an application execution screen, a screen displaying folders, etc. For example, the UI may be a home screen or a menu screen including a plurality of icons, such as an icon mapped to a calling function, an icon mapped to a text messaging function, etc., etc.

In one exemplary embodiment, the UI may include a plurality of pages. For example, if the number of icons is too large to be displayed within one page or if each of icons is displayed in a small size when a plurality of icons are displayed within one page, the UI may include a plurality of pages each including a predetermined number of icons.

In one exemplary embodiment, the controller 130 may control the display unit 110 to display a plurality of regions in a plurality of regions of an UI, respectively. For example, when a UI is a menu screen, the controller 130 may display icons in a plurality of split regions of the menu screen, respectively. When icons are arranged in the plurality of split regions of the menu screen, respectively, the size of each of the plurality of regions may be equal to the size of the icon arranged therein. As another example, the size of each of the plurality of regions may be greater than the size of the icon arranged therein.

In operation S203, the controller 130 may receive a user input for each of at least one region displaying an icon.

In one exemplary embodiment, a user input may be a handwriting input performed by drawing a number (or a numerical value) by a user. For example, a user input may be a handwriting input performed by drawing '5' by a user. In one exemplary embodiment, the handwriting input may be input in each of at least one region displaying an icon. For example, the handwriting input may be input by touching down within a border of a region displaying an icon by a user's finger (or an electronic pen), performing dragging by drawing a number (or a numerical value) within the border of the region, and releasing the touching down within the border of the region.

In one exemplary embodiment, when a user input is a handwriting input performed by drawing a number (or a numerical value) by a user, the controller 130 may set a currently displayed screen to not be moved or switched to another screen while the handwriting input is received. For example, the controller 130 may set the currently displayed screen to be moved or switched to another screen only when a sliding input is performed with respect to a corner region of a left/right end or an upper/lower end of the currently displayed screen, and to not be moved or switched to another screen when a handwriting input is performed on an icon displaying region.

In another exemplary embodiment, a user input may be a touch-down input performed at least once on an icon displaying region. For example, a user input may be a touch-down input performed on an icon displaying region seven times. In one exemplary embodiment, a plurality of touch-down inputs may be continuously performed at preset threshold time intervals. For example, if the threshold time intervals are set to 0.5 seconds, the controller 130 may determine that continuous touch-down inputs are input when a touch-down input is received within 0.5 seconds after a previous touch-down input was received.

In another exemplary embodiment, a user input may be a long-touch input or a holding input on an icon displaying region. For example, a user input may be a long-touch input performed (or maintained) for seven seconds on an icon displaying region. In one exemplary embodiment, when a user input is a long-touch input, the controller 130 may control the display unit 110 to display in a region of an UI a duration for which the long-touch input is performed. In one exemplary embodiment, when a user input is a long-touch input and a duration for which the long-touch input is performed is displayed in a region of a UI, the controller 130 may control the display unit 110 to display the duration in the region of the UI such that the duration is increased at predetermined time intervals. In another exemplary embodiment, when a user input is a long-touch input and a duration for which the long-touch input is performed is displayed, the controller 130 may control the display unit 110 to display, in a region of the UI, a number (or a numerical value) to increased in proportional to the duration (or a holding duration).

In one exemplary embodiment, when a user input on each of at least one region displaying an icon is received, the controller 130 may select the icon displayed in the at least one region for which the user input is received as an icon to be arranged (or rearranged). For example, when a user input on regions respectively displaying three icons is received, the controller 130 may select the three icons in the regions as icons to be arranged.

In operation S205, the controller 130 may determine a number for an icon selected based on the user input as indicated by the user input.

In one exemplary embodiment, when the user input is a handwriting input performed by drawing a number (or a numerical value), the controller 130 may determine a number based on the handwriting input. For example, when the user input is a handwriting input performed (or input) by drawing a number, the controller 130 may recognize a trace touched by a user's finger or the like from the touch panel 121, and determine a number corresponding to the recognized trace. The controller 130 may recognize the touched trace by recognizing a distance, a direction or the like of a touch input performed by the user's finger or the like. In one exemplary embodiment, the controller 130 may compare the recognized trace with traces corresponding to numbers (or numerical values) stored beforehand. The controller 130 may detect a trace corresponding to a number that matches with the recognized trace above a threshold matching rate among the traces corresponding to the stored numbers. The controller 130 may determine the number corresponding to the detected trace to be a number corresponding to the recognized trace.

In another exemplary embodiment, when the user input is a touch-down input, the controller 130 may determine a number based on the touch-down input. For example, the controller 130 may determine a number of times that touching-down is continuously performed to be a number indicated by the touch-down input.

In another exemplary embodiment, when the user input is a long-touch (or holding) input, the controller 130 may determine a number, based on the duration of the long-touch input. For example, the controller 130 may determine an increasing value based on the duration of the long-touch input to be a number indicated by the long-touch input.

In one exemplary embodiment, when the number indicated by the user input is determined, the controller 130 may control the display unit 110 to display the determined number. For example, when the number indicated by the user input is determined to be '5', the controller 130 may control the display unit 110 to display '5'. In one exemplary embodiment, when the determined number is displayed on the display unit 110, the controller 130 may control the display unit 110 to display the determined number such that the determined number partially overlaps a region for which a user input has been received or is displayed in a region adjacent to this region. In one exemplary embodiment, the controller 130 may control the display unit 110 to display the determined number until a selected icon is arranged (or rearranged). In another exemplary embodiment, the controller 130 may control the display unit 110 to display the determined number for a preset time duration and to cancel the displaying of the determined number after the preset time period.

In operation S207, the controller 130 may arrange the selected icon in a region corresponding to the determined number.

In one exemplary embodiment, the controller 130 may set a number for each of a plurality of regions of a UI. In one exemplary embodiment, if a plurality of regions are defined by rows and columns, the controller 130 may set '1' for a region corresponding to a first row and a first column among the plurality of regions. The controller 130 may sequentially set numbers (or values) for regions corresponding to the other columns (e.g., columns following a first column) in the first row, starting from a region corresponding to a second column in the first row. The controller 130 may determine a number following a number set for a region corresponding to a last column in an $(n-1)^{th}$ row to be a number set for a region corresponding to a first column in an $n^{th}$ row.

In another exemplary embodiment, when a UI includes a plurality of pages each including a plurality of regions, the controller 130 may determine a number following a number for a region corresponding to a last row and a last column of an $(n-1)^{th}$ page to be a number for a region corresponding to a first row and a first column of an $n^{th}$ page.

In one exemplary embodiment, the controller 130 may respectively set numbers for a plurality of regions of a UI according to user setting or a designer's intention.

In one exemplary embodiment, when the number indicated by the user input is determined in operation S205, in operation S207, the controller 130 may control the display unit 110 to display a preview displaying the selected icon in the region corresponding to the determined number. For example, when a number for at least one selected icon is determined as indicated by a user input, the controller 130 may control the display unit 110 to display a preview displaying the at least one selected icon in a region corresponding to the determined number. In one exemplary embodiment, the controller 130 may receive a user input for displaying a preview, and control the display unit 110 to display the preview based on the user input. In one exemplary embodiment, when a user input for selecting icon arrangement (or rearrangement) is received from a user in a state in which a preview is displayed, the controller 130 may arrange a selected icon to be the same as an arrangement of an icon displayed in the preview. In another exemplary embodiment, when a user input for canceling the icon arrangement (or rearrangement) (or restoring the icon arrangement (or rearrangement) to an original state) is received from a user in a state in which a preview screen is displayed, the controller 130 may control the display unit 110 to display a UI including icons displayed in an original region from the preview.

In one exemplary embodiment, the controller 130 may arrange the selected icon in the region corresponding to the determined number, and arrange at least some icons among a plurality of icons except for the selected icon. For example, the controller 130 may arrange (or rearrange) icons among the plurality of icons except for the selected icon in regions other than the region in which the selected icon is arranged (or rearranged). In one exemplary embodiment, the controller 130 may arrange an icon displayed in a region in which the selected icon is to be arranged, in a region corresponding to a number following a number that is set for the region in which the selected icon is to be arranged. For example, when the number that is set for the region in which the selected icon is to be arranged is 'n', the controller 130 may arrange in an $(n+1)^{th}$ region an icon displayed in the region in which the selected icon is to be arranged. However, the arrangement of the icon displayed in the region in which the selected icon is to be arranged is not limited thereto.

Figure 3A:
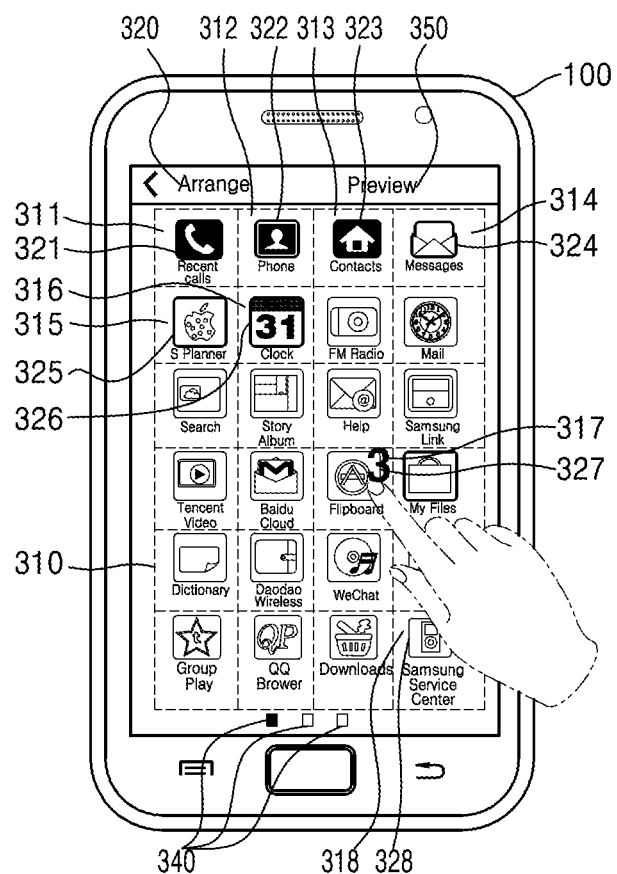
FIGS. 3A and 3B are diagrams illustrating a method of arranging icons according to an exemplary embodiment.
Figure 3B:
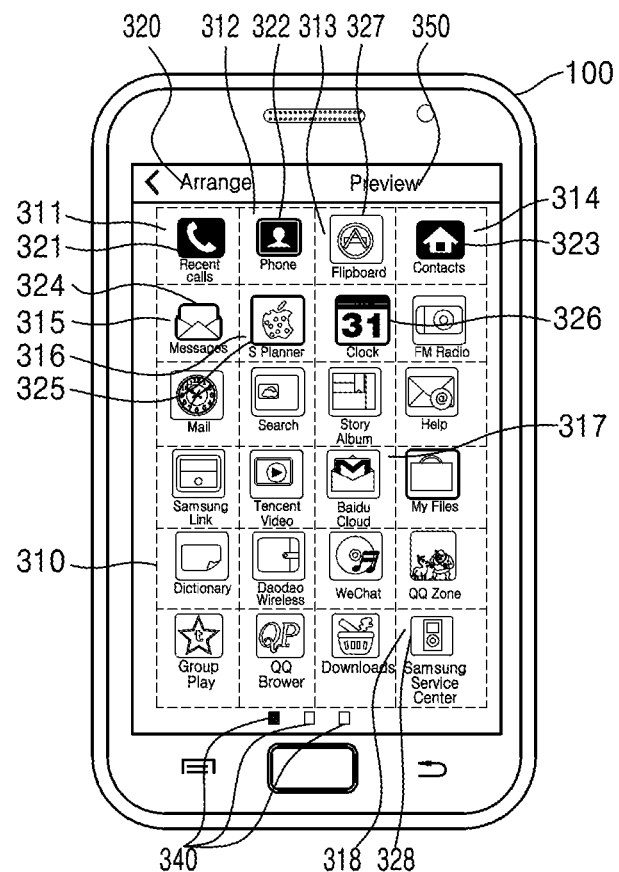

FIGS. 3A and 3B are diagrams illustrating a method of arranging icons according to an exemplary embodiment.

Referring to FIGS. 3A and 3B, the controller 130 may control the display unit 110 to respectively display a plurality of icons 321, 322, 323, 324, 325, 326, 327, and 328 in a plurality of regions 311, 312, 313, 314, 315, 316, 317, and 318 of a region 310 in which icons are displayed. In one exemplary embodiment, the controller 130 may set numbers for the plurality of regions 311, 312, 313, 314, 315, 316, 317, and 318. For example, the controller 130 may sequentially set numbers for the plurality of regions 311, 312, 313, 314, 315, 316, 317, and 318, starting from the left region 311 in an uppermost row of the region 310. The controller 130 may set a number '1' for the region 311, a number '2' for the region 312, a number '3' for the region 313, and a number '4' for the region 314. The controller 130 may sequentially set a number '5' for the region 315 and a number '6' for the region 316 among the plurality of regions 311, 312, 313, 314, 315, 316, 317, and 318, starting from the left region 315 in a second upper row of the region 310. Similarly, the controller 130 may set a number '24' for the rightmost region 318 of a lowermost row of the region 310. However, the numbers set for the plurality of regions 311, 312, 313, 314, 315, 316, 317, and 318 are examples and thus exemplary embodiments are not limited thereto. In one exemplary embodiment, the dotted lines used to separate the plurality of regions 311, 312, 313, 314, 315, 316, 317, and 318 from one another in FIG. 3A may not be actually displayed.

In one exemplary embodiment, when a handwriting input performed to draw '3' in the region 317 is received from a user, the controller 130 may recognize the number '3'. The controller 130 may determine the number '3' as a number indicated by a user input.

In another exemplary embodiment, when a touch-down input that is continuously performed in the region 317 three times is received from a user, the controller 130 may recognize a number '3'. The controller 130 may determine the number '3' as a number indicated by a user input.

In another exemplary embodiment, when a long-touch input performed in the region 317 is received from a user, the controller 130 may determine a number indicated by a user input, based on the duration of the long-touch input.

In one exemplary embodiment, when a number '3' is determined as a number indicated by a user input, based on the user input, the controller 130 may control the display unit 110 to display the determined number '3'.

In one exemplary embodiment, the controller 130 may control the display unit 110 to display a button 320 for selecting an arrangement of an icon for which a user input is received.

In one exemplary embodiment, when a UI includes a plurality of pages, the controller 130 may control the display unit 110 to display page indicators 340 respectively indicating the plurality of pages.

In one exemplary embodiment, the controller 130 may control the display unit 110 to display a preview button 350 for previewing an arrangement of the selected icon 327.

Referring to FIG. 3A, in one exemplary embodiment, when an input for selecting an arrangement of an icon is received from a user, the controller 130 may control the display unit 110 to arrange and display the icon as illustrated in FIG. 3B. For example, when a handwriting input performed (or inputted) by drawing a number '3' in the region 317 displaying the selected icon 327 is received, the controller 130 may control the display unit 110 to arrange and display the selected icon 327 in a region corresponding to the number '3', i.e., the region 313 for which the number '3' is set.

In one exemplary embodiment, when the selected icon 327 is arranged in a region corresponding to a number indicated by a user input, the controller 130 may arrange (or rearrange) at least some of icons except for the selected icon 327. In one exemplary embodiment, the controller 130 may arrange (or rearrange) a plurality of icons in the region 313 in which the selected icon 327 is to be arranged to a region for which a number preceding the number set for the region in which the selected icon 327 was arranged. For example, when the number for the region 317 displaying the selected icon 327 is greater than the number for the region 313 in which the selected icon 327 is to be arranged, the controller 130 may arrange (or rearrange) a plurality of icons, which are arranged in the region 313 in which the selected icon 327 is to be arranged to a region corresponding to a number preceding the number for the region 317 in which the selected icon 327 was arranged, in regions, the numbers for which are greater by '1' than those set for the region 313 to the region corresponding to the preceding number.

For example, as illustrated in FIG. 3B, the controller 130 may arrange the selected icon 327 in the region 313 for which the number '3' is set, and control the display unit 110 to respectively display a plurality of icons (including a "Phone" icon 323 that has been arranged in a region in which the selected icon 327 is to be arranged to a "Baidu Cloud" icon that has been displayed in a region corresponding to a number preceding the number set for the region 317 in which the selected icon 327 has been arranged) in regions, the numbers for which are greater by '1' than those set for regions in which the plurality of icons have been displayed.

Figure 4A:
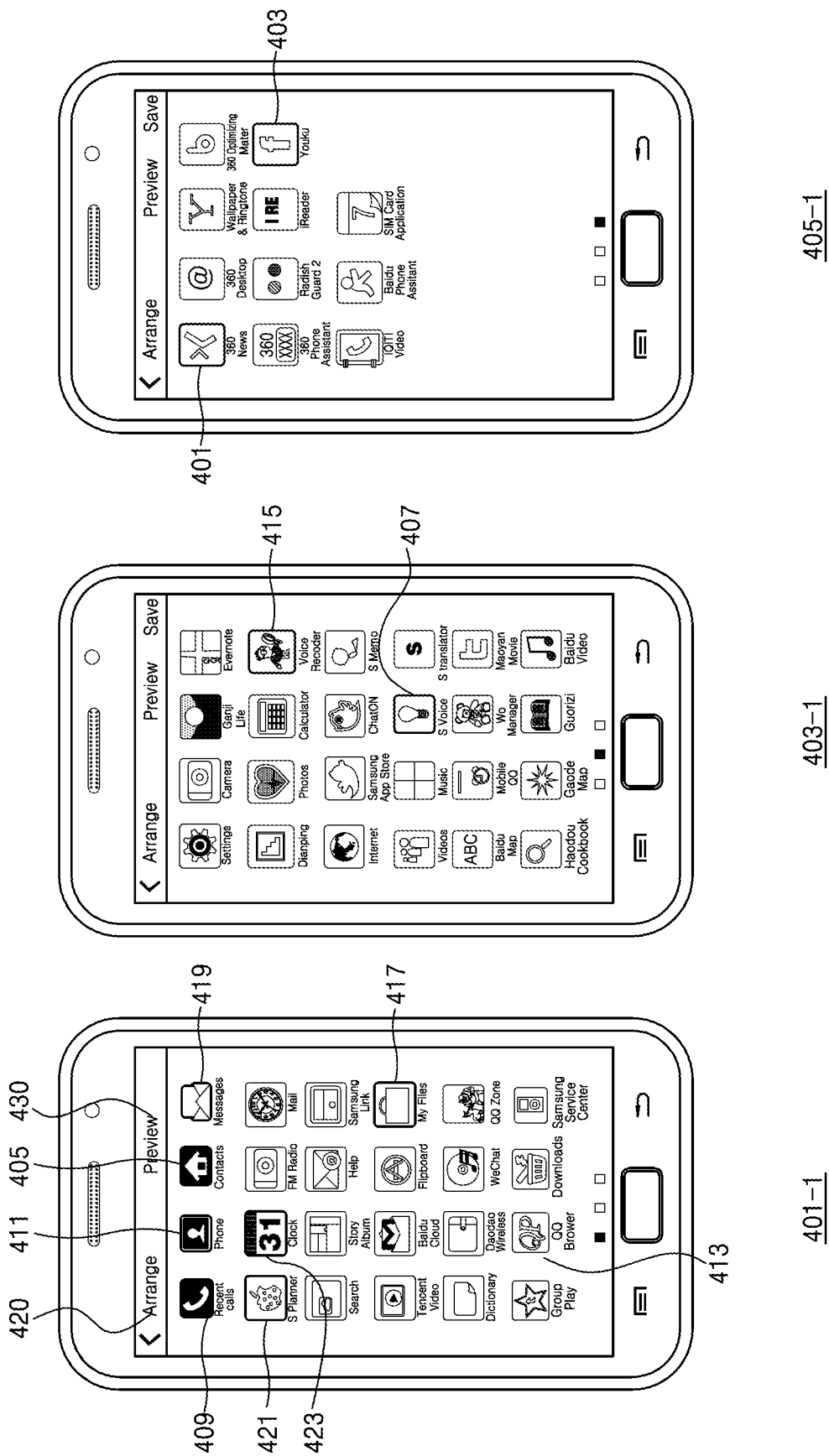
FIGS. 4A and 4B are diagrams illustrating a method of arranging icons according to another exemplary embodiment.
Figure 4B:
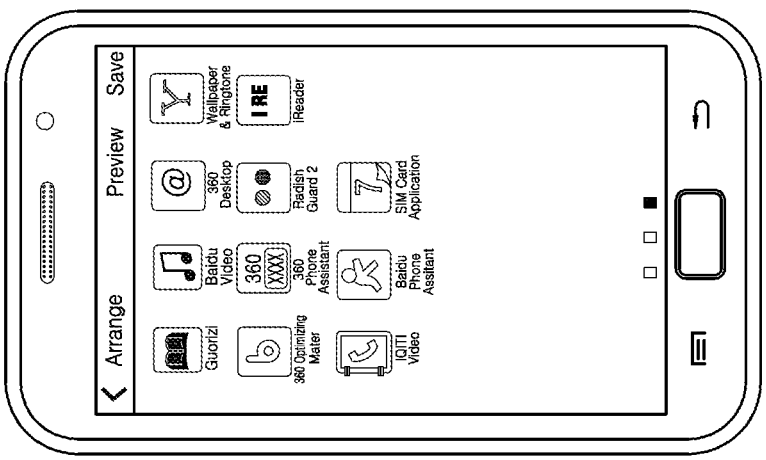
Figure 4B:
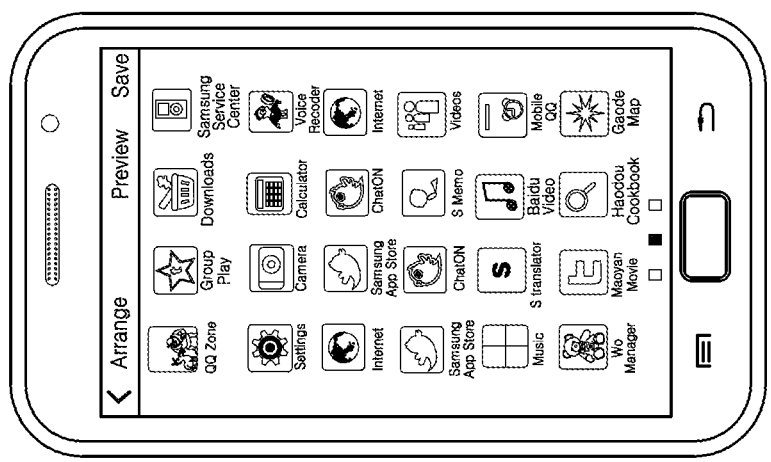
Figure 4B:
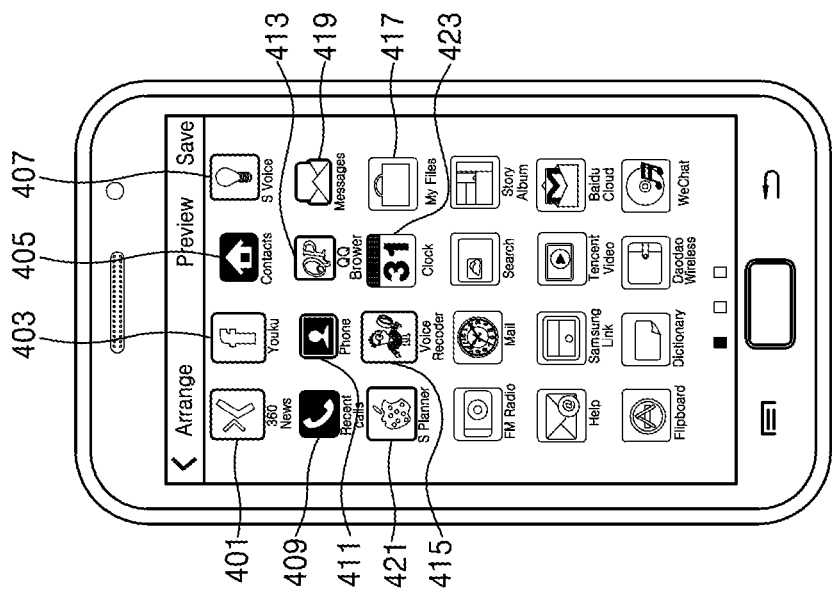

FIGS. 4A and 4B are diagrams illustrating a method of arranging icons according to another exemplary embodiment. FIGS. 4A and 4B illustrate a case in which icons are arranged (or rearranged) in a UI including a plurality of pages.

In FIG. 4A, reference numerals '401-1' and '401-2' denote a first page of the UI, reference numerals '403-1' and '403-2' denote a second page of the UI, and reference numerals '405-1' and '405-2' denote a third page of the UI. In one exemplary embodiment, referring to FIG. 4A, when a user input related to a button 420 for selecting an arrangement of icons is received from a user, the controller 130 may control the display unit 110 to display a plurality of pages as illustrated in FIG. 4B. In another exemplary embodiment, referring to FIG. 4A, when a user input related to a button 430 for selecting a preview is received from a user, the controller 130 may control the display unit 110 to display the plurality of pages as illustrated in FIG. 4B.

In one exemplary embodiment, although not shown, the controller 130 may set numbers for a plurality of regions of the first to third pages, respectively. For example, when the plurality of regions are defined by rows and columns, the controller 130 may set a number '1' for a region corresponding to a first row and a first column (e.g., a region displaying a "Recent calls" icon 409) among the plurality of regions. The controller 130 may sequentially set numbers for regions corresponding to the other columns in the first row, starting from a region corresponding to the first row and a second column. For example, the controller 130 may determine a number following a number corresponding to a last column in an $(n-1)^{th}$ row to be a number corresponding to a first column in an $n^{th}$ row. As another example, the controller 130 determine a number following a number for a region corresponding to a last row and a last column of an $(n-1)^{th}$ page to be a number for a region corresponding to a first row and a first column of an $n^{th}$ page. For example, the controller 130 may determine a number following a number for a region 401 displaying a "Samsung Service Center" icon to be a number for a region 402 displaying a "Settings" icon. However, the numbers that are set for the plurality of regions are merely examples and exemplary embodiments are not limited thereto.

In one exemplary embodiment, the controller 130 may receive user inputs with respect to the plurality of respective regions included in the plurality of pages of the UI. For example, referring to FIG. 4A, the controller 130 may receive user inputs for respective regions respectively displaying icons 401 to 417. The controller 130 may determine numbers for the regions respectively displaying icons 401 to 417 as indicated by a received user input. For example, the controller 130 may determine a number for the region displaying the icon 401 to be '1' as indicated by the received user input. The controller 130 may determine a number for the region displaying the icon 403 to be '2' as indicated by the received user input. The controller 130 may determine a number for the region displaying the icon 405 to be '3' as indicated by the received user input. The controller 130 may determine a number for the region displaying the icon 407 to be '4' as indicated by the received user input. The controller 130 may determine a number for the region displaying the icon 409 to be '5' as indicated by the received user input. The controller 130 may determine a number for the region displaying the icon 411 to be '6' as indicated by the received user input. The controller 130 may determine a number for the region displaying the icon 413 to be '7' as indicated by the received user input. The controller 130 may determine a number for the region displaying the icon 415 to be '10' as indicated by the received user input. The controller 130 may determine a number for the region displaying the icon 417 to be '12' indicated by the received user input. However, the received user input is not limited thereto and at least one user input may be received.

In one exemplary embodiment, the numbers '1', '2', '3', '4', '5', '6', '7', '10', '12', etc. indicated by the user input may not be displayed on the plurality of pages. In another exemplary embodiment, the numbers '1', '2', '3', '4', '5', '6', '7', '10', '12', etc. indicated by the user input may be displayed to respectively overlap regions for which a user input is received. In another exemplary embodiment, the numbers '1', '2', '3', '4', '5', '6', '7', '10', '12', etc. indicated by the user input may be displayed in the vicinity of the regions for which the user input is received.

In one exemplary embodiment, when a plurality of user inputs for the plurality of respective regions and a user input related to the button 430 for selecting a preview are received from a user, the controller 130 may display an icon for which a user input is received, i.e., an icon selected according to the user input, in a region corresponding to a number indicated by a user input as illustrated in FIG. 4B. For example, as illustrated in FIG. 4B, the controller 130 may display the selected icons 401 to 417 in regions corresponding to numbers indicated by a user input. In one exemplary embodiment, the controller 130 may arrange a selected icon, and arrange at least some of icons except for the selected icon according to the region displaying the selected icon. For example, the controller 130 may display the icon 419, which was displayed in a region for which a number '4' is set, in a region for which a number '8' is set. As another example, the controller 130 may display the icon 421, which was displayed in a region for which a number '5' is set, in a region for which a number '9' is set. As another example, the controller 130 may display the icon 423, which was displayed in a region for which a number '6' is set, in a region for which a number '13' is set.

Figure 5:
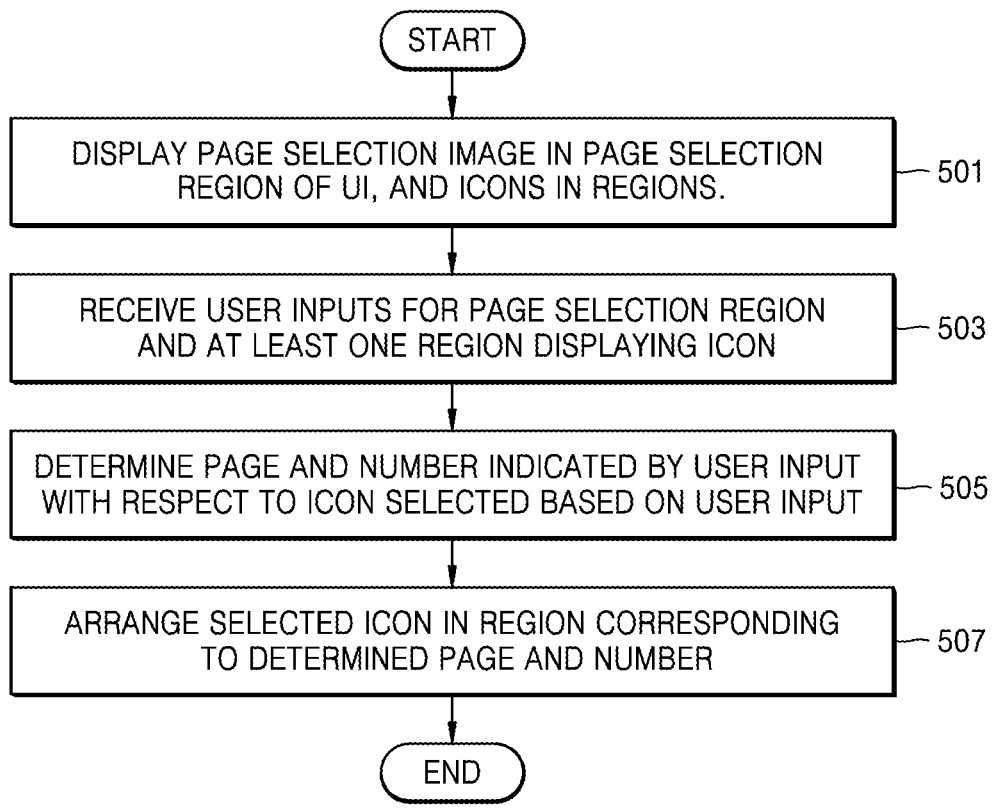
FIG. 5 is a flowchart of a method of arranging icons according to another exemplary embodiment.

FIG. 5 is a flowchart of a method of arranging icons according to another exemplary embodiment. A part of the method of FIG. 5 that is the same as that of the method of FIG. 2 is not redundantly described here.

Referring to FIG. 5, in operation S501, the controller 130 may control the display unit 110 to display a page selection image in a page selection region and display a plurality of icons in a plurality of regions.

In one exemplary embodiment, a UI may be a home screen including a plurality of icons, a menu screen, an application execution screen, or a screen displaying folders, etc. For example, the UI may be a home screen, a menu screen, or the like which includes a plurality of icons such as an icon mapped to a calling function, an icon mapped to a text messaging function, etc.

In one exemplary embodiment, a UI may include a plurality of pages. For example, if the number of icons is too large to be displayed within one page or if each of icons is displayed in a small size when a plurality of icons are displayed within one page, a UI may include a plurality of pages each including a predetermined number of icons. In one exemplary embodiment, the controller 130 may control the display unit 110 to display, on a side region of a screen (or a page), an image for selecting a page in which icons are to be arranged. For example, the controller 130 may control the display unit 110 to display a page button for selecting a page in which icons are to be arranged in a region adjacent to a plurality of regions displaying a plurality of icons. In one exemplary embodiment, the controller 130 may control the display unit 110 to further display a page selection image for creating a new page. In another exemplary embodiment, the controller 130 may control the display unit 110 to display pages except for a currently displayed page.

In operation S503, the controller 130 may receive user inputs on the page selection region and at least one region displaying an icon among the plurality of regions.

In one exemplary embodiment, after receiving a user input for selecting a page, the controller 130 may receive a user input for arranging at least one icon in a selected page. For example, the controller 130 may receive a user input for selecting a page in which at least one icon displayed in a currently displayed page is to be arranged (or rearranged). When a page in which at least one icon is to be arranged is selected, the controller 130 may receive a user input for selecting at least one icon to be arranged within the selected page. In one exemplary embodiment, the user input for selecting a page may be a touch input performed (or inputted) on an image of a page included in a current UI. In another exemplary embodiment, the user input for selecting a page may be a touch input performed on an image for creating a new page. In one exemplary embodiment, the user input for selecting an icon to be arranged may be a handwriting input performed by drawing a number (or a numerical value) by a user. In another exemplary embodiment, the user input for selecting an icon to be arranged may be a touch-down input performed on an icon displaying region at least once. In another exemplary embodiment, the user input for selecting an icon to be arranged may be a long-touch input or a holding input performed on an icon displaying region.

In another exemplary embodiment, the controller 130 may receive a user input indicating a number and a user input for selecting a page with respect to each of icons. For example, the controller 130 may receive a user input indicating a number (e.g., a handwriting input) and a user input for selecting a page (e.g., a touch input performed on an image for selecting a page) with respect to each of the icons. In one exemplary embodiment, the user input for selecting a page may be a user input for creating a new page and designating the created page.

In operation S505, the controller 130 may determine a page and a number indicated by a user input on an icon selected based on the user input.

In one exemplary embodiment, the controller 130 may select a page and a number for a region of the selected page, based on a user input. For example, the controller 130 may select an $n^{th}$ page among a plurality of pages and a number indicating a region of the $n^{th}$ page in which an icon is to be arranged, based on a user input. As another example, when a UI includes n pages, the controller 130 may select an $(n+1)^{th}$ page newly created according to a user input, and determine a number for a region of the $(n+1)^{th}$ page in which an icon is to be arranged.

In operation S507, the controller 130 may arrange the selected icon in a region corresponding to the determined page and number.

In one exemplary embodiment, when a UI includes a plurality of pages, the controller 130 may set numbers for a plurality of respective regions of each of the plurality of pages. When a UI includes n pages, the controller 130 may set numbers for a plurality of respective regions of each of the n pages. For example, when a plurality of regions of a first page of a UI are defined by rows and columns, the controller 130 may set '1' for a region corresponding to a first row and a first column among the plurality of regions of the first page, and sequentially set numbers for regions corresponding to the other columns (e.g., columns followed to a first column) in the first row, starting from a region corresponding to the first row and a second column. Similarly, the controller 130 may set '1' for a region corresponding to a first row and a first column among a plurality of regions of a second page of the UI, and sequentially set numbers for regions corresponding to the other columns in the first row, starting from a region corresponding to the first row and a second column.

In one exemplary embodiment, the controller 130 may arrange a selected icon in a region corresponding to the determined page and number, and arrange at least some of a plurality of icons except for the selected icon. For example, the controller 130 may arrange (or rearrange) the plurality of icons except for the selected icon in regions other than the region in which the selected icon is arranged (or rearranged).

Figure 6:
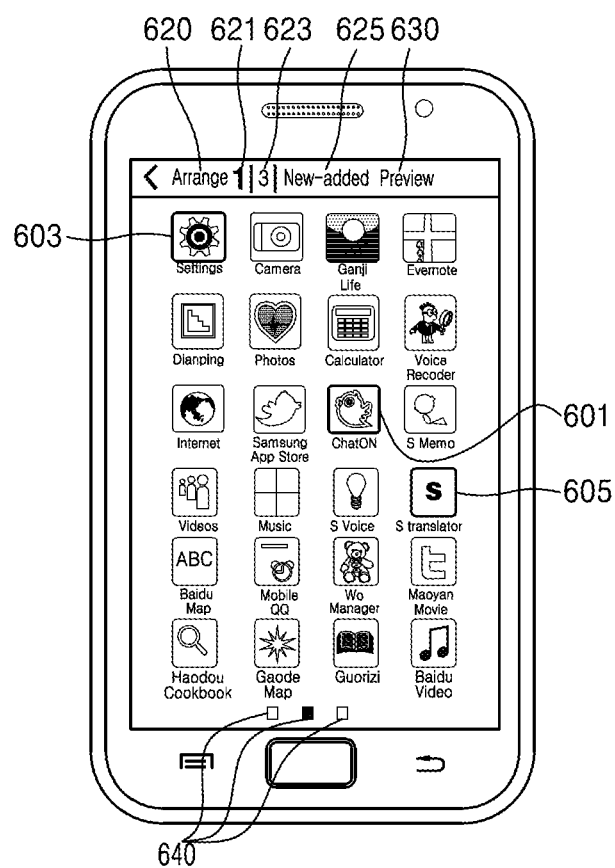
FIG. 6 is a diagram illustrating a method of arranging icons according to another exemplary embodiment.

FIG. 6 is a diagram illustrating a method of arranging icons according to another exemplary embodiment Referring to FIG. 6, the controller 130 controls the display 110 to display a second page among first to third pages as indicated by page indicators 640. In one exemplary embodiment, the controller 130 controls the display 110 to display images 621 to 625 for selecting pages, and a plurality of icons. In one exemplary embodiment, the controller 130 may control the display 110 to display the image 621 for selecting the first page, the image 623 for selecting the third page, and the image 625 for adding a new page. However, exemplary embodiments are not limited thereto, and the controller 130 may control the display unit 110 to further display an image for selecting the currently displayed second page.

In one exemplary embodiment, the controller 130 may receive a user input for selecting the first page among the plurality of pages. For example, the controller 130 may receive from a user a touch input performed on the image 621 to select the first page. In one exemplary embodiment, when one of the plurality of pages is selected, the controller 130 may control the display unit 110 to display the selected page such that a size, color, shading, or highlight effect is added to the selected page to be differentiated from the other pages.

In one exemplary embodiment, the controller 130 may determine numbers for regions in which a "ChatON" icon 601, a "Settings" icon 603, and an "S translator" icon 605 are arranged, respectively, as indicated by a user input. For example, the controller 130 may determine '2' for the region in which the "ChatON" icon 601 is arranged, as indicated by the received user input. The controller 130 may determine '6' for the region in which the "Settings" icon 603 is arranged, as indicated by the received user input. The controller 130 may determine '12' for the region in which the "S translator" icon 605 is arranged, as indicated by the received user input.

In one exemplary embodiment, when an input on an arrangement selection button 620 (e.g., a touch input on the arrangement selection button 620) is received on icons for which a user input is received from a user (i.e., the selected "ChatON" icon 601, "Settings" icon 603, and "S translator" icon 605), the controller 130 may arrange the selected "ChatON" icon 601, "Settings" icon 603, and "S translator" icon 605 in a selected page, i.e., a region of the first page for which a determined number is set.

In another exemplary embodiment, when an input of a preview selection button 630 (e.g., a touch input related to the preview selection button 630) is received with respect to icons for which a user input is received from a user (i.e., the selected "ChatON" icon 601, "Settings" icon 603, and "S translator" icon 605), the controller 130 may control the display unit 110 to display a preview of the selected icon "ChatON" icon 601, "Settings" icon 603, and "S translator" icon 605 arranged in a selected page, i.e., a region of the first page for which a determined number is set.

Figure 7:
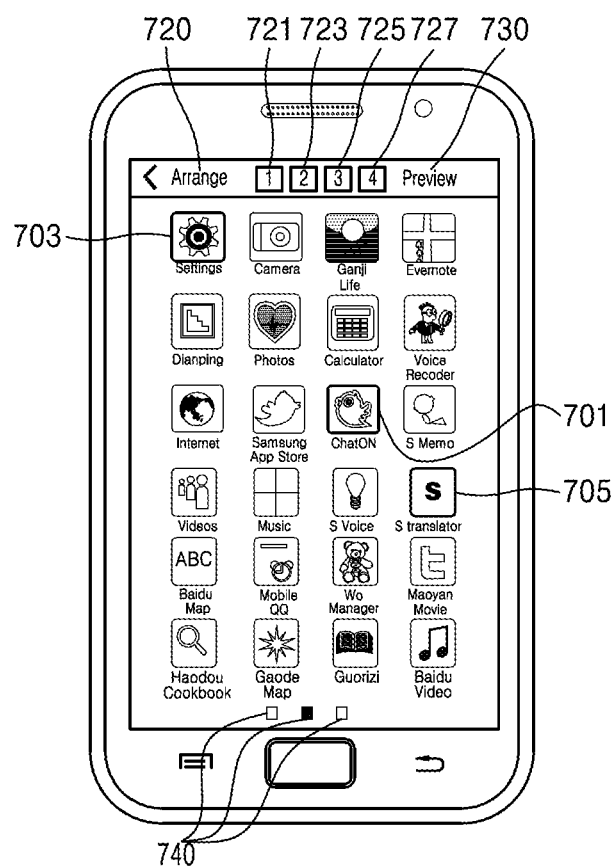
FIG. 7 is a diagram illustrating a method of arranging icons according to another exemplary embodiment.

FIG. 7 is a diagram illustrating a method of arranging icons according to another exemplary embodiment.

Referring to FIG. 7, the controller 130 controls the display unit 110 to display a second page among first to third pages as indicated by page indicators 740. In one exemplary embodiment, the controller 130 may control the display unit 110 to display images 721 to 727 for selecting pages, and a plurality of icons. In one exemplary embodiment, the controller 130 may control the display unit 110 to display not only the image 723 for selecting the currently displayed page, i.e., the second page, but also the image 721 for selecting the first page, the image 725 for selecting the third page, and an image 727 for adding a fourth page as a new page.

In one exemplary embodiment, the controller 130 may receive a user input indicating a number for each of icons and a user input for selecting a page. For example, the controller 130 may receive a user input indicating a number '2' for a region displaying a "ChatON" icon 701 and a user input for selecting the first page, receive a user input indicating a number '6' for a region displaying a "Settings" icon 703 and a user input for selecting the third page, and receive a user input indicating a number '12' for a region displaying an "S translator" icon 705 and a user input for selecting the second page. For example, the controller 130 may receive a touch input performed on the image 721 for selecting the first page and a handwriting input indicating the number '2' for the region displaying the "ChatON" icon 701. Sequentially, the controller 130 may receive a touch input performed on the image 725 for selecting the third page and a handwriting input indicating the number '6' for the region displaying the "Settings" icon 703, and receive a touch input performed on the image 723 for selecting the currently displayed second page and a handwriting input indicating the number '12' for the region displaying the "S translator" icon 705.

In one exemplary embodiment, the controller 130 may arrange the "ChatON" icon 701 in the region of the first page for which the number '2' is set, arrange the "Settings" icon 703 in the region of the third page for which the number '6' is set, and arrange the "S translator" icon 705 in the region of the second page for which the number '12' is set, based on the user inputs that are sequentially received.

In one exemplary embodiment, the controller 130 may control the display unit 110 to display an image 720 for selecting an arrangement of a selected icon, and an image 730 for selecting a preview.

Figure 8:
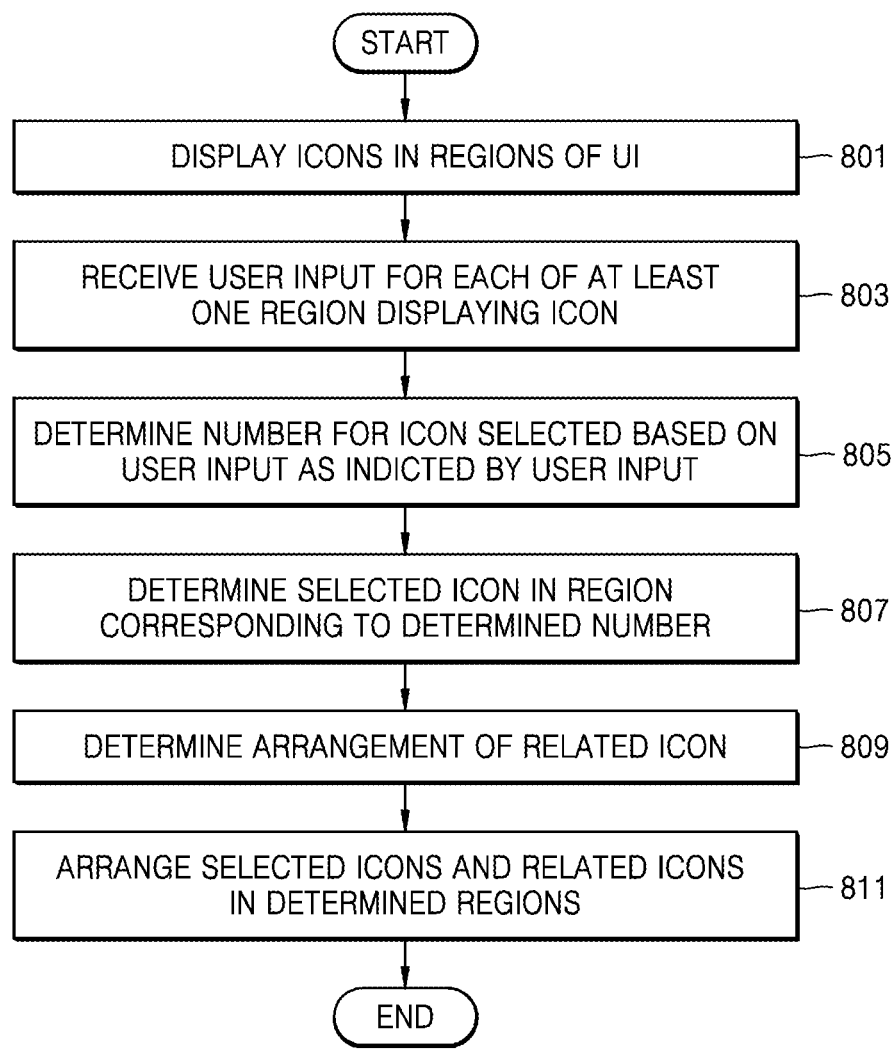
FIG. 8 is a flowchart of a method of arranging icons according to another exemplary embodiment.

FIG. 8 is a flowchart of a method of arranging icons according to another exemplary embodiment. A part of the method of FIG. 8 that is the same as that of the method of FIG. 2 or 5 is not redundantly described here.

Referring to FIG. 8, in operation S801, the controller 130 may control the display unit 110 to display a plurality of icons in a plurality of regions of a UI. In operation S803, the controller 130 may receive a user input for each of at least one region displaying an icon. In operation S805, the controller 130 determines a number for an icon selected based on the user input as indicated by the user input. In operation S807, the controller 130 may determine the selected icon to be arranged in a region corresponding to the determined number.

In operation S809, the controller 130 may determine an arrangement of an icon to be arranged in the region in which the selected icon is arranged (hereinafter referred to as a 'related icon').

In one exemplary embodiment, the related icon may be an icon arranged in a region in which the selected icon is to be arranged. For example, the related icon may be an icon that is being currently displayed in the region in which the selected icon is to be displayed and for which a number indicated by a received user input is set. In one exemplary embodiment, when the related icon is being currently displayed in the region in which the selected icon is to be displayed and for which a number indicated by a received user input is set, the controller 130 may determine a region in which the selected icon is being currently displayed to be a region in which the related icon is to be arranged. For example, the controller 130 may control the display unit 110 to switch the selected icon and the icon arranged in the region in which the selected icon is to be arranged (or rearranged) to each other and display a result of switching the selected icon and the icon. In one exemplary embodiment, when user inputs are received on a plurality of respective regions respectively displaying a plurality of icons, the controller 130 may determine the plurality of regions respectively displaying the plurality of icons to be regions in which a plurality of icons displayed in regions for which numbers indicated by the user input are set, i.e., a plurality of related icons, are to be arranged.

In another exemplary embodiment, the controller 130 may receive a user input for selecting related icons, the number of which is equal to the number of icons selected to be arranged (or rearranged), and arrange the related icons in regions in which the selected icons are arranged. For example, in order to determine regions in which icons selected according to a user input instructing an arrangement (or rearrangement) of icons are to be arranged (or rearranged), the controller 130 may receive a user input for selecting related icons, the number of which is equal to the number of the selected icons. In one embodiment, the controller 130 may arrange the related icons in the regions in which the selected icons are arranged, based on at least one of the order in which the related icons are selected, and numbers for which the regions in which the related icons are displayed are set (or the order of the regions). For example, when the number of the related icons is 'n', the controller 130 may receive a user input for setting an order of the n related icons. The controller 130 may control the related icons to be displayed in the regions in which the selected icons have been arranged, according to the numbers indicated by the user input and in the order that is set according to the user input.

In operation S811, the controller 130 may arrange the selected icons and the related icons in the determined regions. In one exemplary embodiment, the controller 130 may arrange the selected icons and the related icons in the determined regions, and arrange (or rearrange) the other icons.

Figure 9:
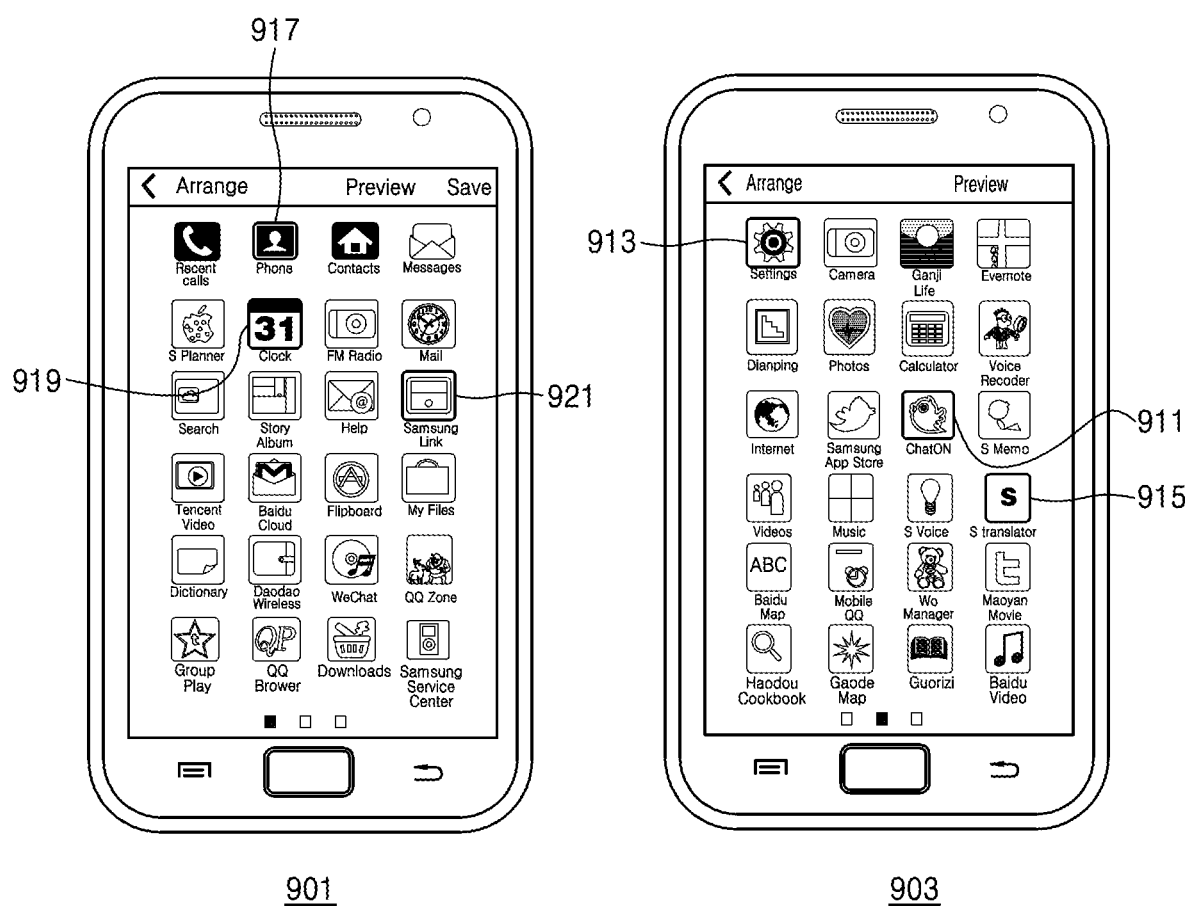
FIGS. 9 and 10 are diagrams illustrating methods of arranging icons according to exemplary embodiments.
Figure 10:
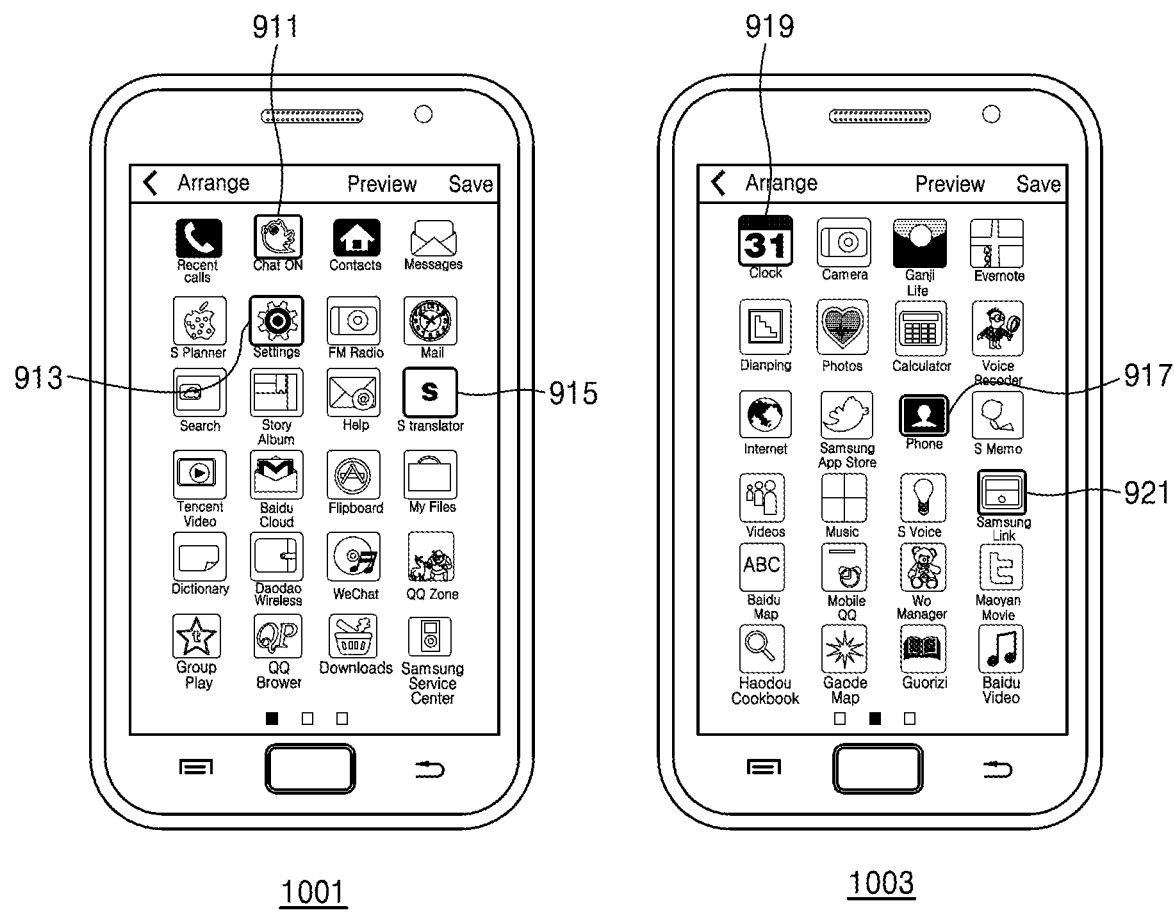

FIGS. 9 and 10 are diagrams illustrating methods of arranging icons according to exemplary embodiments. FIG. 9 illustrates a page in which selected icons and related icons have yet to be arranged (or rearranged). FIG. 10 illustrates the page in which the selected icon and the related icons are arranged (or rearranged).

Referring to FIGS. 9 and 10, reference numerals '901' and '903' respectively denote a first page and a second page among a plurality of pages of a UI. In one exemplary embodiment, the controller 130 may receive a user input indicating a number '2', a number '6', and a number '12' for respective regions of the second page 903 that respectively display a "ChatON" icon 911, a "Settings" icon 913, and an "S translator" icon 915. In one exemplary embodiment, the related icons may be a "Phone" icon 917, a "Clock" icon 919, and a "Samsung Link" icon 921 displayed in the regions for which the number '2', the number '6', and the number '12' are set, respectively.

In one exemplary embodiment, the controller 130 may control the display unit 110 to switch the selected icon "ChatON" icon 911, "Settings" icon 913, and "S translator" icon 915 to the "Phone" icon 917, the "Clock" icon 919, and the "Samsung Link" icon 921 which are related icons, respectively, and display a result of switching as illustrated in FIG. 10. For example, the controller 130 may control the selected icon "ChatON" icon 911 of the first page 901 to be displayed in the region for which the number '2' is set, the selected icon "Settings" icon 913 to be displayed in the region for which the number '6' is set, and the selected icon "S translator" icon 915 to be displayed in the region for which the number '12' is set. The controller 130 may arrange the "Phone" icon 917, the "Settings" icon 919, and the "Samsung Link" icon 921 which are related icons in regions in which the selected icon "ChatON" icon 911, "Settings" icon 913, and "S translator" icon 915 were displayed, respectively. In other words, the controller 130 may switch the selected icons and the related icons corresponding to the selected icons to one another.

Figure 11:
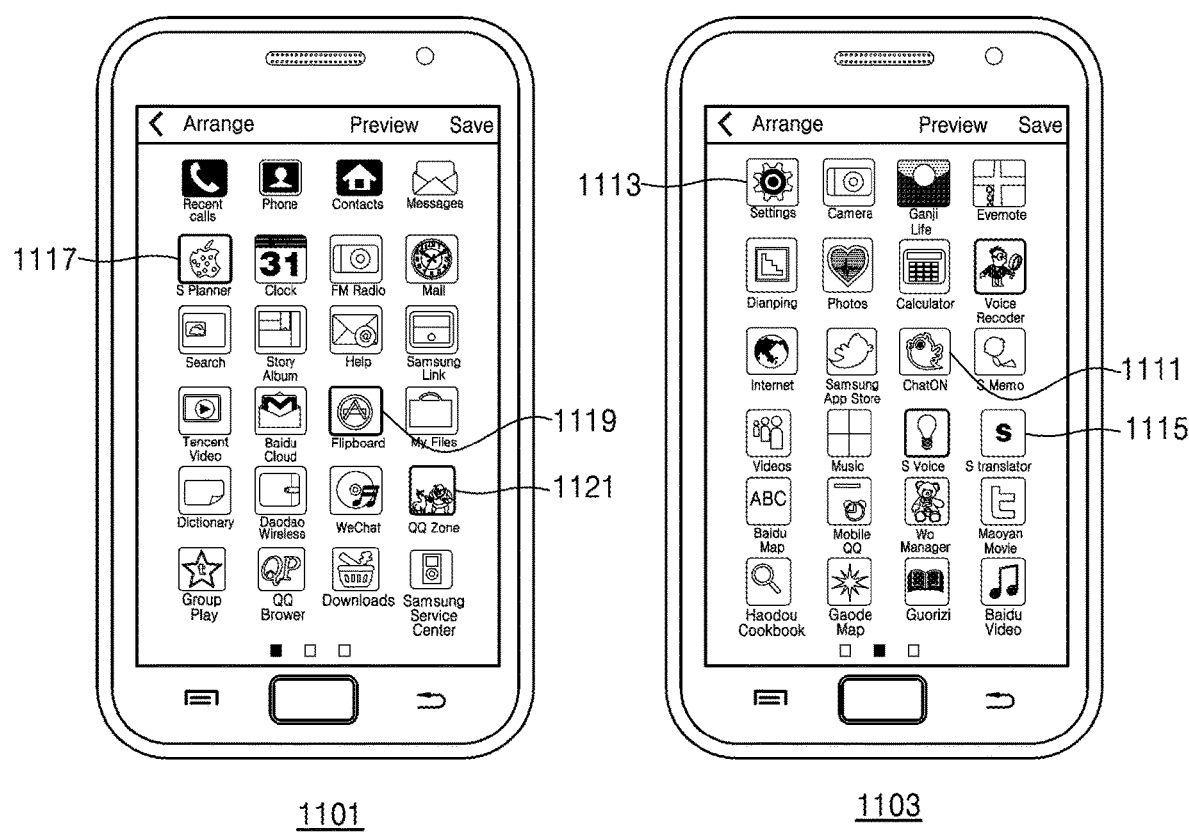
FIGS. 11 and 12 are diagrams illustrating methods of arranging icons according to exemplary embodiments.
Figure 12:
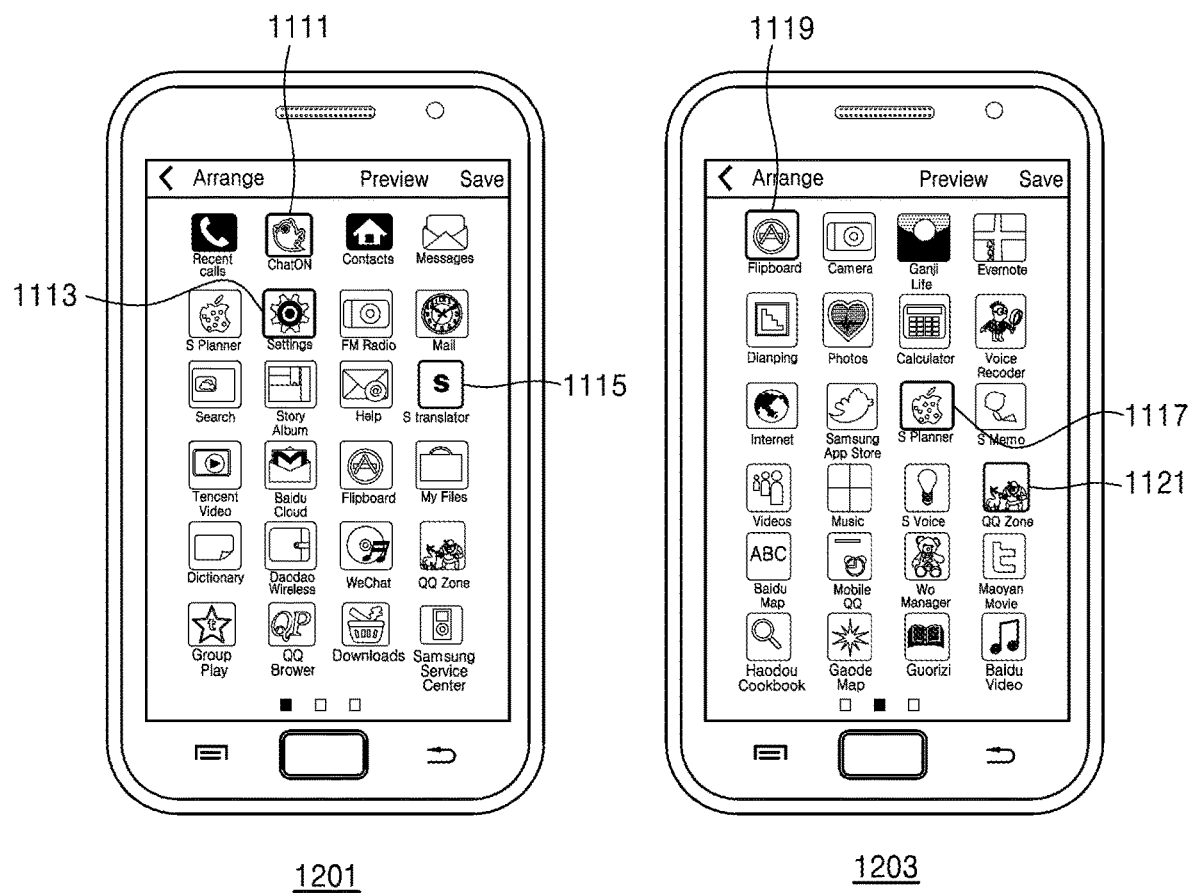

FIGS. 11 and 12 are diagrams illustrating methods of arranging icons according to exemplary embodiments. FIG. 11 illustrates a page in which selected icons and related icons have yet to be arranged (or rearranged). FIG. 12 illustrates the page in which the selected icon and the related icons are arranged (or rearranged).

Referring to FIGS. 11 and 12, reference numerals '1101' and '1103' respectively denote a first page and a second page among a plurality of pages of a UI. In one exemplary embodiment, the controller 130 may receive a user input indicating a number '2', a number '6', and a number '12' for respective regions that respectively display a "ChatON" icon 1111, a "Settings" icon 1113, and an "S translator" icon 1115. In one exemplary embodiment, the controller 130 may sequentially receive user inputs for selecting an "S Planner" icon 1117, a "Flipboard" icon 1119, and a "QQ Zone" icon 1121 as related icons, the number of which is equal to the number of selected icons in the first page 1101. In one exemplary embodiment, the user inputs for selecting the related icons may be touch inputs performed on respective regions each displaying one of icons, the number of which is equal to the number of the selected icons among the icons except for the selected icons. In one exemplary embodiment, the controller 130 may set an order of the related icons according to an order in which the regions displaying the related icons are selected based on the user inputs. For example, when user inputs with respect to the regions respectively displaying the "S Planner" icon 1117, the "Flipboard" icon 1119, and the "QQ Zone" icon 1121 are sequentially received, the order of the related icons may be set as the order of the "S Planner" icon 1117, the "Flipboard" icon 1119, and the "QQ Zone" icon 1121.

In one exemplary embodiment, the controller 130 may arrange the related icons in the regions in which the selected icons were arranged, based on the order in which the related icons are selected. For example, when user inputs with respect to the regions respectively displaying the "S Planner" icon 1117, the "Flipboard" icon 1119, and the "QQ Zone" icon 1121 in the first page 1101 are sequentially received, the controller 130 may arrange the selected icons as illustrated in a first page 1201, and respectively arrange the "S Planner" icon 1117, the "Flipboard" icon 1119, and the "QQ Zone" icon 1121 in the regions respectively displaying the selected icons in the order of the region corresponding to the number '2', the region corresponding to the number '6', and the region corresponding to the number '12' indicated by the user inputs as illustrated in a second page 1203. For example, the controller 130 may arrange the "S Planner" icon 1117 which is a first selected related icon in the region for which the number '2' indicated by the user input is set and in which the "ChatON" icon 1111 was displayed. The controller 130 may arrange the "Flipboard" icon 1119 which is a secondly selected related icon in the region for which the number '6' indicated by the user input is set and in which the "Settings" icon 1113 was displayed. The controller 130 may arrange the "QQ Zone" icon 1121 which is a thirdly selected related icon in the region for which the number '12' indicated by the user input is set and in which the "S translator" icon 1115 was displayed.

As described above, in methods of arranging icons and electronic devices according to various embodiments, icons of a UI are moved according to numbers indicated by a user input, thereby arranging the icons in a simple and easy manner.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of arranging an icon in an electronic device, the method comprising:
    displaying, on a display screen of the electronic device, a plurality of icons in a plurality of regions defined by rows and columns on the display screen, each region of the plurality of regions being assigned a unique number, and each region of the plurality of regions enclosing only a portion of the display screen and being sized to surround a single icon;
    obtaining a first user input operation performed entirely within a first region surrounding a first icon, among the plurality of regions, the first user input operation identifying a number that specifies a second region different from the first region, among the plurality of regions, to which the first icon is to be moved, wherein the identifying the number that specifies the second region being independent of any user input operation that is performed outside the first region; and
    displaying the first icon at the second region selected based on the first user input operation identifying the number that specifies the second region,
    wherein the obtaining of the first user input operation comprises obtaining a handwriting input performed by drawing a number, entirely within the first region, corresponding to the identified number, a touch-down input performed a number of times, entirely within the first region, corresponding to the identified number, or a long-touch input performed for a time period, entirely within the first region, corresponding to the identified number.

2. The method of claim 1, wherein the displaying of the first icon further comprises determining the number indicated by the obtained first user input operation, and
    the determining of the number indicated by the obtained first user input operation further comprises displaying the determined number in the first region.

3. The method of claim 1, wherein the displaying of the first icon further comprises displaying a preview of the first icon arranged in the second region corresponding to the number.

4. The method of claim 1, wherein, when the display screen includes a plurality of pages, and
    the method further comprises setting the unique number for each of the plurality of regions, wherein the setting the unique number for each of the plurality of regions comprises sequentially setting numbers for all of the plurality of regions included in the plurality of pages or setting numbers for a plurality of regions included in each of the plurality of pages.

5. The method of claim 4, further comprising obtaining a user input for selecting at least one page among the plurality of pages, and
    wherein the displaying of the first icon further comprises arranging the first icon in a region corresponding to the selected at least one page and the number.

6. The method of claim 1, further comprising determining an arrangement of a related second icon that is in the second region corresponding to the number before the first icon is arranged.

7. The method of claim 6, further comprising arranging the related second icon in the first region in which the first icon has been arranged.

8. The method of claim 6, further comprising:
    obtaining a second user input operation performed entirely within a third region surrounding a third icon, among the plurality of regions, the second user input operation identifying a number that specifies a fourth region different from the third region, among the plurality of regions, to which the third icon is to be moved, wherein the identifying the number that specifies the fourth region being independent of any user input operation that is performed outside the third region;
    displaying the third icon at the fourth region selected based on the second user input operation identifying the number that specifies the fourth region; and
    arranging the related second icon and a related fourth icon that is in the fourth region corresponding to the number before the third icon is arranged, based on an order in which the related second icon and the related fourth icon are selected or numbers set for respective regions displaying the related second icon and the related fourth icon.

9. An electronic device comprising:
    a display configured to display a plurality of icons in a plurality of regions defined by rows and columns on a display screen, each region of the plurality of regions being assigned a unique number, and each region of the plurality of regions enclosing only a portion of the display screen and being sized to surround a single icon; and
    at least one processor configured to: obtain, through a user interface, a first user input operation performed entirely within a first region surrounding a first icon, among the plurality of regions, the first user input operation identifying a number that specifies a second region different from the first region, among the plurality of regions, to which the first icon is to be moved, wherein the identifying the number that specifies the second region being independent of any user input operation that is performed outside the first region; and
    control the display to display the first icon at the second region selected based on the first user input operation identifying the number that specifies the second region,
    wherein the obtaining of the first user input operation comprises obtaining a handwriting input performed by drawing a number, entirely within the first region, corresponding to the identified number, a touch-down input performed a number of times, entirely within the first region, corresponding to the identified number, or a long-touch input performed for a time period, entirely within the first region, corresponding to the identified number.

10. The electronic device of claim 9, wherein the at least one processor is configured to control the display to display the number in the first region.

11. The electronic device of claim 9, wherein the at least one processor is configured to control the display to display a preview of the first icon moved to the second region corresponding to the number.

12. The electronic device of claim 9, wherein, when the display includes a plurality of pages, the at least one processor is configured to sequentially set numbers for all of the plurality of regions included in the plurality of pages or set numbers for a plurality of regions included in each of the plurality of pages.

13. The electronic device of claim 12, wherein the at least one processor configured to:
obtain, through the user interface, a user input for selecting at least one page among the plurality of pages, and
arrange the first icon in a region corresponding to the selected at least one page and the number.

14. The electronic device of claim 9, wherein the at least one processor is configured to determine an arrangement of a related second icon that is in the second region corresponding to the number before the first icon is arranged.

15. The electronic device of claim 14, wherein the at least one processor is configured to arrange the related second icon in the first region in which the first icon has been arranged.

16. The electronic device of claim 14, wherein the at least one processor is configured to:
obtain a second user input operation performed entirely within a third region surrounding a third icon, among the plurality of regions, the second user input operation identifying a number that specifies a fourth region different from the third region, among the plurality of regions, to which the third icon is to be moved, wherein the identifying the number that specifies the fourth region being independent of any user input operation that is performed outside the third region;
control the display to display the third icon at the fourth region selected based on the second user input operation identifying the number that specifies the fourth region; and
arrange the related second icon and a related fourth icon that is in the fourth region corresponding to the number before the third icon is arranged, based on an order in which the related second icon and the related fourth icon are selected or numbers set for regions displaying the related second icon and the related fourth icon.

17. The method of claim 1, wherein the displaying the first icon to the second region is only based on the first user input operation performed on the first region.

* * * * *